March 22, 1938.    S. R. McKINNEY    2,111,671
SERVING COUNTER SCALE
Filed June 20, 1936    2 Sheets-Sheet 1

Inventor
Sidney R. McKinney
By Cushman, Darby & Cushman
Attorneys

March 22, 1938.   S. R. McKINNEY   2,111,671
SERVING COUNTER SCALE
Filed June 20, 1936   2 Sheets-Sheet 2

Inventor
Sidney R. McKinney
By Cushman, Darby & Cushman
Attorneys

Patented Mar. 22, 1938

2,111,671

UNITED STATES PATENT OFFICE 2,111,671

SERVING COUNTER SCALE

Sidney R. McKinney, Clovis, N. Mex.

Application June 20, 1936, Serial No. 86,401

12 Claims. (Cl. 265—27)

The present invention relates to weighing scales and more particularly to scales of the platform type designed for weighing persons.

An object of the invention is to provide a weighing scale designed particularly for use with soda fountain or other service counters having a row of stools positioned at the front to permit customers to be seated while being served. The invention contemplates incorporating each stool as part of the scale whereby a customer may weigh himself while seated at the counter. Furthermore, the weight indicator and coin receiving slot are adapted to be positioned adjacent the edge of the counter and directly in front of the customer where they will be accessible and attractively displayed.

With the foregoing and other objects in view, the invention will now be more fully described, reference being had to the accompanying drawings, in which Figure 1 is a side elevation, partly in section, of my serving counter scale;

Figure 5 is a plan view of the weight indicator and the edge of the counter, and Figure 6 is a partial plan view of the scale platform and stool base.

Figure 1:
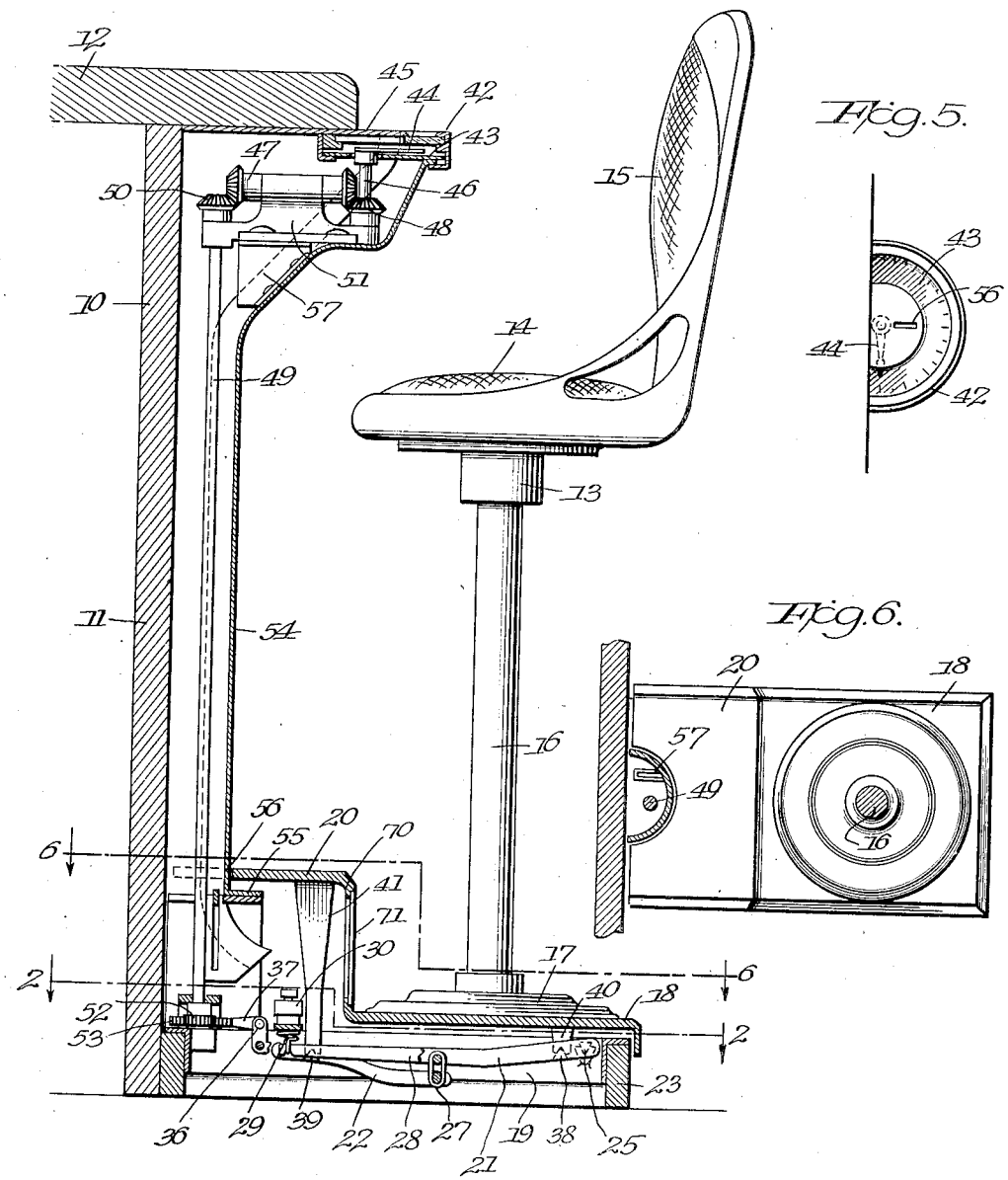

Referring to the drawings and particularly to Fig. 1, there is disclosed the preferred embodiment of my invention wherein the numeral 10 indicates a soda or other service counter having a vertical wall 11 and a horizontal shelf 12, the front end of which extends beyond the wall 11. Counters of this type are usually provided with a plurality of stools for the convenience of the customers being served. The numeral 13 designates a stool of this character having the usual seat and back portions 14 and 15 respectively, the seat being rotatably mounted upon a pedestal 16. The pedestal, instead of being secured to the flooring in the usual manner, has its base 17 supported upon and secured to a platform 18 of a weighing scale 19. This platform is provided with a front elevated portion 20 which constitutes a foot rest for accommodating the feet of the person being served at the counter 10. Thus, the inclusion of the weighing scale with the stool does not interfere with the use of the stool as such, in the event the customer merely wishes to be served without using the scale.

The weighing mechanism 19 may be of any desired construction capable of supporting the platform 18 and in the present instance I have provided main and auxiliary levers 21 and 22 respectively, mounted in a base 23, the front end of which is adapted to contact with the vertical wall 11 of the counter. The lever 21 is of general Y-formation and is provided adjacent the ends of its legs with lateral projections 24 which are suitably mounted in brackets 25 of the base. The auxiliary lever 22 is of substantial V-shape with the ends of the legs mounted in brackets 26, similar to the brackets 25. As in levers of this type, the base of the auxiliary lever 22 extends inwardly and is loosely connected to the main lever by means of a link 27.

The extreme end of the arm 28 of the lever 21 is supported by the lower end of a coil spring 29, the upper end of the spring being connected to adjusting mechanism 30 supported upon the cross bar 31 of the base 23. The arm 28 is further provided intermediate its ends with a lateral projection 32 which is pivotally connected to one end of a short link 33. The other end of the link 33 is pivotally secured to one arm of a bell crank lever 34, this lever being suitably mounted upon an arm 35 depending from the cross bar 31. The other arm 36 of the bell crank lever is pivotally connected to a horizontal rod 37 which extends forwardly and connects with mechanism for actuating the weight indicating device, as will be hereinafter described.

The specific means for supporting the platform 18 on the weighing mechanism comprises sets of laterally projecting supports 38 and 39 secured to the levers 19 and 22 respectively. These supports are tapered upwardly to form knife edges, the members 38 supporting brackets 40 which project from the under side of the platform adjacent its outer end. The means for supporting the front portion of the platform upon the weighing mechanism comprises elongated brackets 41 which are secured to the under side of the elevated footrest 20. These brackets extend downwardly to the weighing mechanism and similarly to the brackets 40, are provided with V-shaped notches in their lower ends for receiving the lateral supports 39 of the levers 22. With this arrangement, a person occupying the stool with his feet upon the elevated footrest 20, will be perfectly balanced on the platform and in correct position to be weighed, if this is desired.

It is important that the scale indicating mechanism be conveniently and attractively displayed to the customer. For this reason, I position the same adjacent the edge of the shelf 12 directly in front of the seat 14. This mechanism comprises a casing 42 having a plate 43 carrying suitable indicia, a pointer 44 and a cover glass 45. The pointer 44 is connected to a vertical stub shaft 46 which in turn is operatively connected to a horizontal shaft 47 by means of suitable bevel gearing 48. In like manner, the stub shaft 47 is connected to a vertical shaft 49 by means of bevel gearing 50 and these shafts are journalled in a bearing member 51 positioned below the shelf 12 and inwardly from the front edge thereof. The lower end of the vertical shaft 49 is journalled in the base 23 and has a pinion 52 fixedly secured thereto. This pinion meshes with a rack 53 formed on the aforementioned rod 37, thereby completing the connection between the indicator mechanism and the weighing mechanism.

In order that the operating mechanism may be concealed from view and the weighing mechanism give a pleasing appearance, I provide an enclosing casing 54 extending from the base 23 of the weighing mechanism to the indicating mechanism. While this casing may be formed in any desired shape or design, I preferably make the portion which encloses the shaft 49, of substantially semi-circular formation so that the two vertical edges contact the vertical wall 11 of the counter. The upper portion of the casing is not only designed to enclose the shafts and gearing but also to support the bearing member 51. I preferably secure the upper portion of the casing to the counter in any desired manner, although this is not absolutely necessary, as the casing and operating mechanism may be self-sustaining and merely placed in contacting relation with the counter.

The lower end of the casing projects below the elevated section 20 of the platform and terminates in a horizontal flange 55 which rests upon and is secured to a portion of the base 23, as shown in Figure 1. The section 20 of the platform is centrally recessed as at 56 to accommodate the casing, but otherwise is formed so that its rear edge terminates in close proximity to the wall 11, when the scale is properly installed.

I prefer to utilize as part of the equipment, coin controlled locking means which will retain the scales in inoperative position until a coin of suitable denomination is dropped into a slot 56. As shown, this slot is conveniently located in the indicating casing 42 and connects with a trackway 57 which extends downwardly adjacent the wall 12 within the casing 54. The lower portion 58 of this trackway terminates within the large portion 20 of the platform and there is sufficient space to permit a coin box 59 to be placed directly below the end of the slot 58 to receive the coins as they are discharged from the slot.

Figure 2:
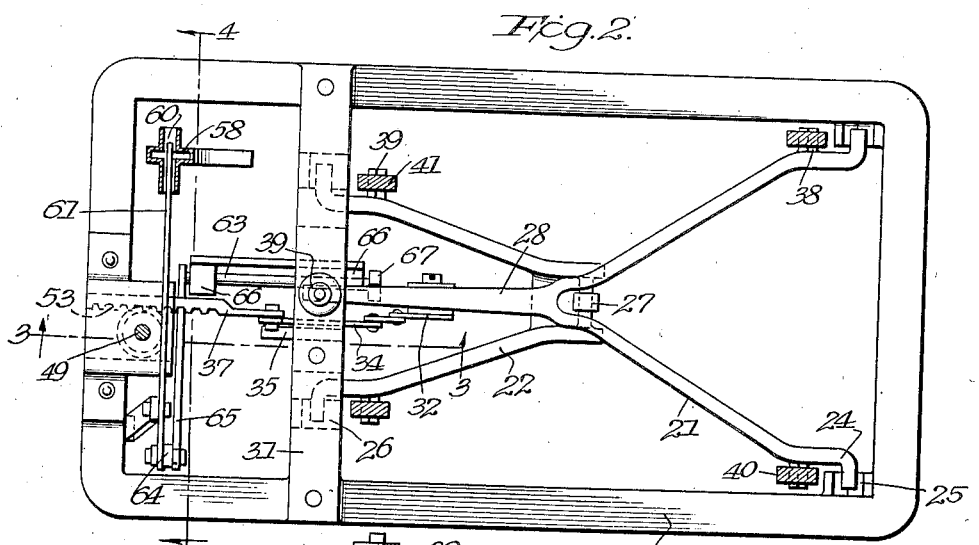
Figure 2 is a section taken on line 2—2 of Figure 1.
Figure 3:
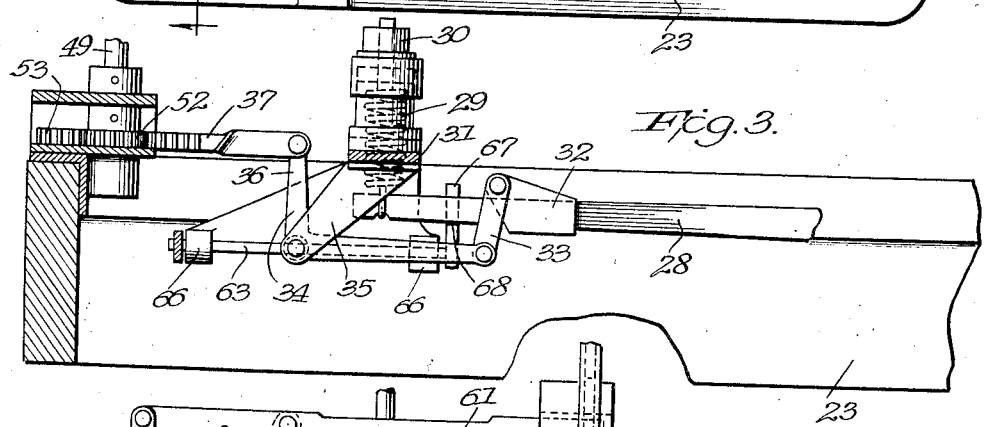
Figure 3 is an enlarged section taken on line 3—3 of Figure 2.
Figure 4:
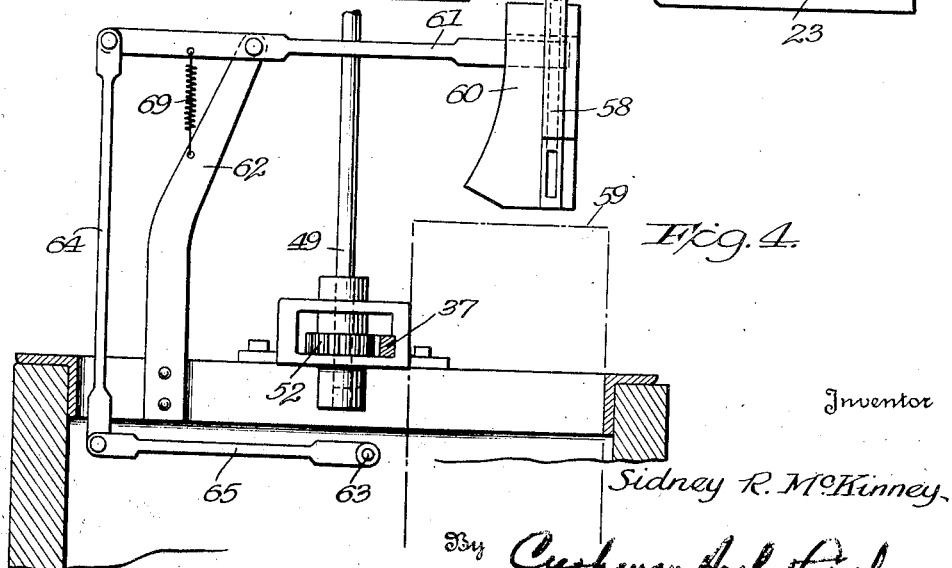
Figure 4 is an enlarged fragmentary view of the coin controlled mechanism.

Referring to Figures 2 and 4, it will be observed that the lower portion 58 of the trackway is formed with a cross guideway 60 intersecting the coin trackway and designed to receive the free end of a coin operated rod 61. This rod is pivotally mounted upon a standard 62 and is connected to a locking bar 63 by means of pivotally connected links 64 and 65 respectively. The locking bar 63 extends substantially parallel to the arm 28 of the lever 21 and is journalled in a bracket 66 depending from the cross rod 31. The free end of this bar terminates in an upwardly projecting lug 67 having a seat 68 which normally engages beneath the arm 28, preventing the latter from moving downwardly and thus maintaining the scale in inoperative position.

With the coin controlled mechanism positioned as above described, and assuming that a person occupying the seat 14 wishes to be weighed, it is merely necessary to insert a coin in the slot 56. The coin will roll down the trackway 57 and when it reaches the lower end, the force of the coin as it contacts with the rod 61 will move the latter about its pivot and out of the path of the coin, permitting the same to enter the coin box 59. At the same time, the movement of the rod 61 will actuate the links 64 and 65 and rotate the locking bar 63 sufficiently to move the lug 67 away from the arm 28. This will leave the arm 28 free to move downwardly and permit the weighing mechanism to function correctly. The weight of the person on the stool will force the platform downwardly and with it the levers 21 and 22. Downward movement of the arm 28 will actuate bell crank lever 34 and rod 37, rotating the vertical and horizontal shafts 49 and 47 and thereby moving the pointer 44 with respect to the indicia carrying plate 43 to indicate the weight of the person seated on the stool.

Preferably, a spring 69 is connected to the rod 61 and standard 62 to return the rod to its upper position in the guideway 60 and at the same time, move the lug 67 back into engagement with the arm 28. The seat 68, of course, will not return to locking position and engage beneath the arm 28 until the weight of the person is removed from the seat 14 or platform 18.

It will be observed that the coin box 59 is placed close to the vertical wall 70 of the platform. This wall has a door 71 mounted therein which may be opened to gain access to the box, when it is desired to collect the coins.

The present invention constitutes an improvement on the usual type weighing scale in that it permits a person to weigh himself while seated at a counter. This may be accomplished while the customer is waiting to be served. If the customer does not desire to weigh himself, the device does not in any manner interfere with the usual counter service, as the weighing mechanism, counter and stool are purposely constructed to permit use of the counter and stool in the usual manner. In this connection, each stool may be provided with the regular footrests instead of forming the scale platform with the elevated section. The illustrated arrangement is the preferred embodiment, however, as it permits the customer to be more comfortably seated and better balanced if he desires to use the scale.

It is to be understood that the term "stool" as used in the specification and claims is to be broadly construed as constituting any type of support or seat which may be used in the same manner as the stool 16 of the present invention.

Such variations from the construction herein shown and described as are within the skill of a mechanic, may, of course, be made without departing from the range of my invention.

I claim:—

1. A weighing scale for use with a serving counter comprising weighing mechanism adapted to be positioned in front of the counter, a platform associated with the weighing mechanism, a stool mounted on the platform and adapted to be spaced from the counter sufficiently to permit a person occupying the stool to utilize the counter, and weight indicating mechanism connected to said weighing mechanism and adapted to be associated with the counter in front of the stool but spaced from said stool sufficiently to permit a person utilizing the counter to maintain a normal and convenient posture.

2. A weighing scale for use with a serving counter comprising weighing mechanism adapted to be positioned in front of the counter, a platform associated with the weighing mechanism, a stool mounted on the platform and adapted to be spaced from the counter sufficiently to permit a person occupying the stool to utilize the counter, and weight indicating mechanism connected to said weighing mechanism and adapted to be positioned adjacent the front of the counter in line with and above the seat of the stool but spaced from the stool sufficiently to permit a person utilizing the counter to maintain a normal and convenient posture.

3. A weighing scale for use with a serving counter having an overhanging shelf, said scale including weighing mechanism adapted to be positioned in front of the counter, a platform associated with the weighing mechanism, a stool mounted on the platform and adapted to be spaced from the counter sufficiently to permit a person occupying the stool to utilize the counter, and weight indicating mechanism connected to the weighing mechanism and having a portion thereof adapted to be positioned adjacent the front of the shelf, said indicating mechanism being located in front of the stool but spaced therefrom sufficiently to permit a person utilizing the counter to maintain a normal and convenient posture.

4. A weighing scale for use with a serving counter having an overhanging front shelf, said scale including weighing mechanism adapted to be positioned in front of the counter, a platform associated with the weighing mechanism, a stool mounted on the platform and adapted to be spaced from the counter sufficiently to permit a person occupying the stool to utilize the counter, weight indicating mechanism adapted to be positioned adjacent the front of the shelf in front of the stool but spaced from the stool sufficiently to permit a person utilizing the counter to maintain a normal and convenient posture, and transmission means connecting the weighing and indicating mechanisms and adapted to be positioned beneath the shelf in close proximity to the counter wall.

5. A weighing scale for use with a serving counter having an overhanging front shelf and a front wall, said scale including weighing mechanism adapted to be positioned on the floor directly in front of the counter wall, a platform carried by the weighing mechanism, a stool mounted on the platform and adapted to be spaced from the counter sufficiently to permit a person occupying the stool to utilize the counter, weight indicating mechanism adapted to be positioned adjacent the front of the shelf in front of the stool but spaced from the stool sufficiently to permit a person utilizing the counter to maintain a normal and convenient posture, and transmission mechanism between the weighing and indicating mechanisms including a portion adapted to project inwardly from the indicating mechanism beneath the shelf, and a second portion extending downwardly from the first mentioned portion to the weighing mechanism and adapted to be positioned in close proximity to the counter wall.

6. A weighing scale for use with a serving counter having an overhanging front shelf and a front wall, said scale including weighing mechanism adapted to be positioned on the floor directly in front of the counter wall, a platform carried by the weighing mechanism, a stool mounted on the platform and adapted to be spaced from the counter sufficiently to permit a person occupying the stool to utilize the counter, weight indicating mechanism adapted to be positioned adjacent the front of the shelf in front of the stool but spaced from the stool sufficiently to permit a person utilizing the counter to maintain a normal and convenient posture, transmission mechanism between the weighing and indicating mechanisms including a shaft connected to the weighing mechanism and adapted to be positioned in close proximity to the counter wall, and means connecting the shaft to the indicating mechanism and adapted to be positioned substantially beneath the overhanging shelf.

7. A weighing scale for use with a serving counter having an overhanging front shelf and a front wall, said scale including weighing mechanism adapted to be positioned on the floor directly in front of the counter wall, a platform carried by the weighing mechanism, a stool mounted on the platform and adapted to be spaced from the counter sufficiently to permit a person occupying the stool to utilize the counter, weight indicating mechanism adapted to be positioned adjacent the front of the shelf in front of the stool but spaced from the stool sufficiently to permit a person utilizing the counter to maintain a normal and convenient posture, transmission mechanism between the weighing and indicating mechanisms including a vertical shaft adapted to be positioned in close proximity to the counter wall and having its lower end connected to the weighing mechanism, and a substantialy horizontal shaft connecting the upper end of the vertical shaft to the indicating mechanism and adapted to be positioned substantially beneath the overhanging shelf.

8. A weighing scale for use with a serving counter comprising weighing mechanism adapted to be positioned in front of the counter, a platform associated with the weighing mechanism, a stool mounted on the platform and adapted to be spaced from the counter sufficiently to permit a person occupying the stool to utilize the counter, said platform having a portion thereof constituting a footrest to accommodate the feet of the person occupying the stool, and weight indicating mechanism connected to said weighing mechanism and adapted to be associated with the counter in front of the stool but spaced from said counter sufficiently to permit a person utilizing the counter to maintain a normal and convenient posture.

9. A weighing scale for use with a serving counter comprising weighing mechanism adapted to be positioned in front of the counter, a platform associated with the weighing mechanism, a stool mounted on the platform and adapted to be spaced from the counter sufficiently to permit a person occupying the stool to utilize the counter, said platform having an elevated portion constituting a footrest to accommodate the feet of the person occupying the stool, and weight indicating mechanism connected to said weighing mechanism and adapted to be associated with the counter in front of the stool but spaced from said stool sufficiently to permit a person utilizing the counter to maintain a normal and convenient posture.

10. A weighing scale for use with a serving counter comprising weighing mechanism adapted to be positioned in front of the counter, a platform associated with the weighing mechanism, a stool mounted on the platform and adapted to be spaced from the counter sufficiently to permit a person occupying the stool to utilize the counter, the front portion of said platform in advance of said stool being elevated and constituting a footrest to accommodate the feet of the person occupying the stool, and weight indicating mechanism connected to said weighing mechanism and adapted to be associated with the counter in front of the stool but spaced from said stool sufficiently to permit a person utilizing the counter to maintain a normal and convenient posture.

11. A weighing scale for use with a serving counter comprising weighing mechanism adapted to be positioned in front of the counter, a platform associated with the weighing mechanism, a stool mounted on the platform and adapted to be spaced from the counter sufficiently to permit a person occupying the stool to utilize the counter, weight indicating mechanism adapted to be associated with the counter in front of the stool but spaced from the stool sufficiently to permit a person utilizing the counter to maintain a normal and convenient posture, and transmission means connecting the weighing and indicating mechanisms, said platform having a front portion extending on opposite sides of the transmission mechanism and constituting a footrest.

12. A weighing scale for use with a serving counter comprising weighing mechanism adapted to be positioned in front of the counter, a platform associated with the weighing mechanism, a stool mounted on the platform and adapted to be spaced from the counter sufficiently to permit a person occupying the stool to utilize the counter, weight indicating mechanism adapted to be associated with the counter in front of the stool but spaced from the stool sufficiently to permit a person utilizing the counter to maintain a normal and convenient posture, transmission means connecting the weighing and indicating mechanisms, and a casing for the transmission means, said platform having a front elevated portion embracing the casing and constituting a footrest adapted to move relative to the casing during the weighing operation.

SIDNEY R. McKINNEY.